July 2, 1968  A. W. HOLSTEIN ET AL  3,390,626
COFFEE VENDOR WITH CLEANING SYSTEM Filed April 25, 1966  2 Sheets-Sheet 1

United States Patent Office 3,390,626
Patented July 2, 1968

3,390,626
COFFEE VENDOR WITH CLEANING SYSTEM
Alvin W. Holstein, Brentwood, and Harry H. Pryor, St. Louis, Mo., assignors to Universal Match Corporation, St. Louis, Mo., a corporation of Delaware
Filed Apr. 25, 1966, Ser. No. 545,143
15 Claims. (Cl. 99—283)

ABSTRACT OF THE DISCLOSURE

A system for cleaning the brewer of a coffee vendor by delivering hot water from the hot water tank of the vendor and a cleaning agent from a supply thereof to the brewer, holding the cleaning agent and hot water in the brewer for a cleaning interval, discharging the cleaning agent and hot water, and then rinsing with hot water from the tank. Switches operated by cams driven by a programmer motor program the cleaning cycle, which is initiated by closure of a manual start switch, the cycle being automatically terminated. The cleaning agent is delivered via a retractable nozzle, which is retracted on completion of delivery to preclude leakage of cleaning agent into the brewer. The vendor has a coffee delivery spout movable from a position for delivering coffee from the brewer into a cup to a cup by-pass position during a cleaning cycle, to prevent the possibility of cleaning solution and rinse water being delivered into a cup and being drunk in the mistake that it is a cup of coffee.

---

This invention relates to coffee vendors, i.e., vendors for brewing and vending coffee, and more particularly to a cleaning system for such vendors.

The invention is particularly concerned with coffee vendors of the type having a brewer for receiving a change of ground coffee and in hot water is delivered to the brewer for brewing coffee, the brewer being subsequently opened for discharging the spent coffee grounds and for recharging it with a fresh charge of ground coffee. The vendor may be of the single-cup type, for brewing one cup of coffee at a time, or of the batch brew type, for brewing a multiple cup batch at a time. For brewing good coffee, the brewer and the delivery line for the brewed coffee should be thoroughly cleaned at frequent intervals. Heretofore, this has been left to be carried out by the servicemen employed by the operators of vending machine routes, and has been a time-consuming operation, resulting in many instances in too infrequent thorough cleaning with resultant vending of inferior coffee.

Accordingly, among the several objects of this invention may be noted the provision of a built-in cleaning system for a coffee vendor adapted automatically to carry out a thorough cleaning cycle, comprising application of a cleaning agent followed by rinsing, for the brewer and delivery line, on manual start (momentary action of a start switch) by the servicemen, thereby promoting cleaning of the vendor on each stop by the serviceman; and the provision of a cleaning system such as described which is safe against leakage of cleaning agent into the brew system of the vendor so as to eliminate the possibility of contamination of brewed coffee by the cleaning agent. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated:

Corresponding reference characters indicate corresponding parts throughout the several views of the drawings.

Figure 1:
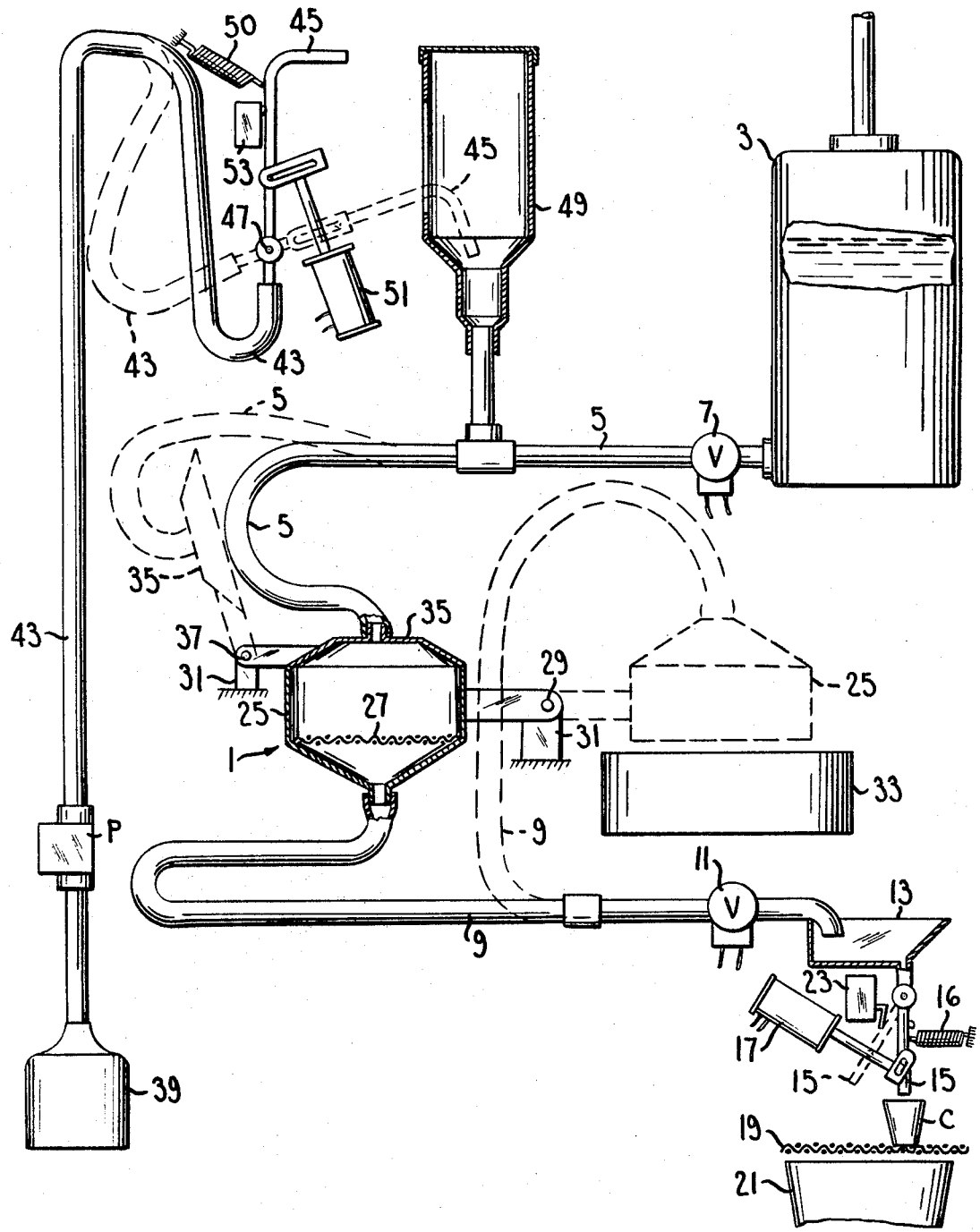
FIG. 1 is a diagrammatic view showing a coffee vendor equipped with a cleaning system in accordance with this invention.

Referring to FIG. 1 of the drawings, there is indicated at 1 the brewer of a coffee vendor, typically one that is referred to as a single-cup vendor for brewing a single cup of coffee and delivering it to a drinking cup C on each vend cycle. In FIG. 1, the size of the brewer is exaggerated in respect to the size of the cup C. It will be understood, however, that the invention as hereinafter disclosed is also applicable to a batch-brew vendor for brewing a plural-cup batch of coffee and delivering it to a reservoir wherein the batch is stored for dispensing a cup at a time. At 3 is indicated a hot water tank holding a supply of hot water for delivery to the brewer for both brewing and cleaning, as will appear. As shown, a line 5 including a solenoid valve 7 extends from the hot water tank to the brewer for delivering hot water to the brewer. Valve 7, when energized, opens for delivery of hot water and, when deenergized, cuts off flow of hot water. A line 9 including a solenoid valve 11 extends from the brewer to a mixer 13, shown as a bowl. Valve 11 is normally open and closes when energized.

The bowl 13 is one such as conventionally provided in a coffee vendor for delivery of sugar and/or cream for mixing with coffee flowing from the brewer. Unconventionally, in accordance with this invention, the bowl has an outlet spout 15 which is movable, as by being pivoted, between a cup-delivery position such as shown in solid lines in FIG. 1 and a cup by-pass position such as shown in dotted lines in FIG. 1. The spout is biased toward its cup-delivery position by a spring 16, and solenoid 17 has its plunger connected to the spout for swinging the spout to its said by-pass position. Normally, the spout occupies its cup-delivery position for delivering brwed coffee into a cup C on a vend cycle, but on energization of solenoid 17 as occurs on a cleaning cycle, the spout is moved to its cup by-pass position for discharge of cleaning solution and rinse water off to one side of the cup and thence through the usual cup-supporting grille 19 of the vendor to a waste can indicated at 21. A switch 23 is mounted adjacent the spout for actuation thereby when the spout swings to its by-pass position.

The brewer 1, as herein illustrated, is of a type comprising a brew cup 25 open at the top and having a filter screen 27 at its bottom, and pivoted as indicated at 29 on a base structure indicated at 31 for swinging movement between an upright brew position shown in solid lines in FIG. 1 and an inverted dump position shown in dotted lines in FIG. 1 for dumping spent coffee grounds into a waste can indicated at 33. A lid 35 is provided for closing the top of the brew cup when the latter is in its upright brew position, this lid being shown as pivoted at 37 on the base structure. Line 5 is connected to the lid, being flexible to the extent required to permit opening and closing of the lid. Line 9 is connected to the bottom of the brew cup, being flexible to the extent required to permit swinging of the cup between its stated positions. The arrangement is such that, with the brew cup in its upright brew position, and with the lid open, a charge of ground coffee may be fed into the brew cup, after which the lid may be closed and hot water fed through the brewer to brew coffee. After passage of the brewed coffee out of the brewer to the cup C, lid 35 may be opened, and the brew cup swung over to its inverted position to dump the spent grounds. Suitable mechanism, details of which are not critical so far as this invention is concerned, is provided for swinging the brew cup and the lid.

At 39 is shown a container for a concentrated liquid cleaning agent, any of various cleaning agents conventionally used for cleaning coffee makers being suitable. A pump P, such as a conventional vacuum pump driven by an electric motor PM (see FIG. 2) is provided for pumping cleaning agent from container 39 via a line 43 to a nozzle 45. This nozzle is movable, as by being pivoted at 47, between a delivery position such as shown in dotted lines in FIG. 1 for delivering the cleaning agent into a funnel 49 connected into line 5 between the valve 7 and the brewer 1, and a retracted position withdrawn from the funnel as shown in solid lines in FIG. 1, for breaking communication to the brewer. A spring 50 biases the nozzle to its retracted position and a solenoid 51 is provided for swinging the nozzle down to its delivery position on energization of the solenoid. A switch 53 is positioned for actuation by the nozzle when retracted.

Figure 2:
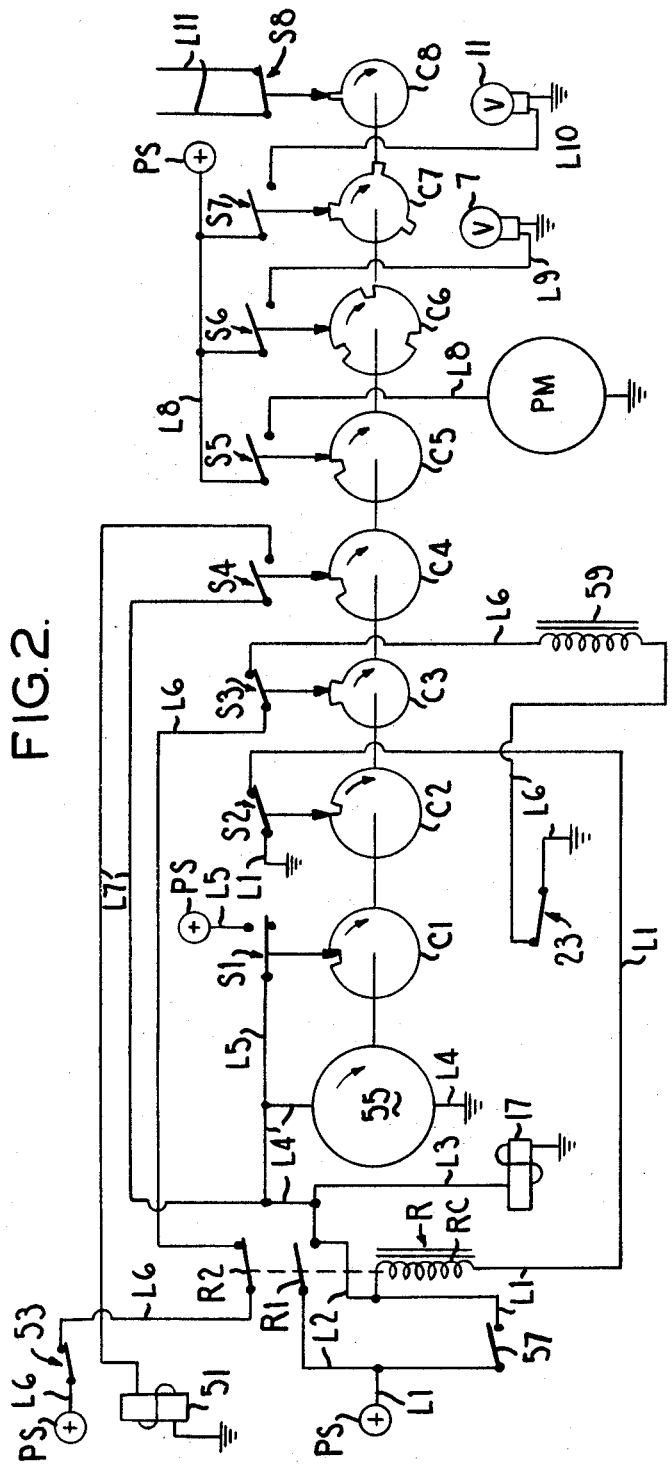
FIG. 2 is a wiring diagram.
Figure 3:
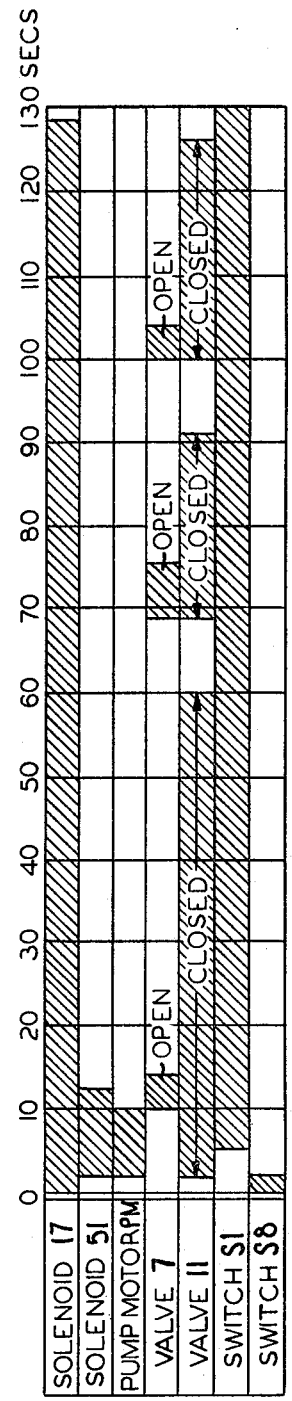
FIG. 3 is a chart showing the timing of operation of various components of the system.

FIG. 2 shows the cleaning cycle control circuitry, which includes a programmer motor 55 and FIG. 3 is a time chart showing the duration and time of occurrence of the various steps in the cleaning cycle. As illustrated in FIG. 3, but by way of example only, the total length of time of a cleaning cycle is 130 seconds. The programmer motor 55 is set into operation to start a cycle by closure of a manual start switch 57 and is automatically deenergized at the termination of the 130 second cycle. During this cycle, the motor drives a series of eight cams C1–C8 through a single revolution and these cams control various operations during the cycle, as will appear. Generally, as may be seen from FIG. 3, the solenoid 17 is energized at the start of a cycle to swing the spout 15 to its cup by-pass position, remains energized to hold the spout in this position until about the 128th second of the cycle, and is then deenergized to allow the spout 15 to swing back to its vertical cup-delivery position. At about the 2nd second of the cycle, the solenoid 51 is energized to swing the nozzle 45 down to its delivery position and the pump motor PM is energized to drive the pump P to pump cleaning solution from container 39 into the line 5. Also starting at the 2nd second, the solenoid valve 11 is energized to close it for holding cleaning solution and water in the brewer. Solenoid 51 remains energized until about the 12th second and the pump motor PM remains energized until about the 10th second, whereupon they are deenergized. On deenergization of solenoid 51, nozzle 45 swings back up to its normally retracted position, and on deenergization of the pump motor flow of cleaning agent stops. Valve 11 is energized to close at about the 2nd second and remains energized and closed until about the 60th second of the cycle. At about the 10th second, valve 7 is opened for about 4 seconds to deliver hot water from tank 3 to the brewer. The water and cleaning agent are held in the brewer until the 60th second (valve 11 being closed) whereupon valve 11 opens and allows the water and cleaning agent to drain out of the brewer. At about the 69th second, valve 11 is closed and valve 7 is open to deliver a hot water rinse to the brewer. Valve 7 is opened until about the 75th second, and valve 11 is held closed until about the 91st second. At the 91st second, valve 11 is opened to allow the rinse water to drain out of the brewer. At about the 100th second, valve 11 is closed and valve 7 is opened to deliver a second hot water rinse to the brewer. Valve 7 is opened until about the 104th second and valve 11 is held closed until about the 126th second. Thereupon valve 11 is opened to allow the second rinse to drain out of the brewer.

Cams C1–C8 respectively control switches S1–S8, each of which is a single-throw switch. At R in FIG. 2 is indicated a relay having a coil RC and two sets of single-throw contacts R1 and R2. Contacts R1 are normally open; contacts R2 are normally closed. Coil RC is connected in series with the manual start switch 57 and cam-actuated switch S2 as indicated at L1 between a power source PS and ground. Switch S2 is referred to as a reset switch. Cam C2 is formed to hold this reset switch closed at the start of a cycle and throughout about the first 128 seconds of the cycle (about 354° rotation of the cam), to open it for the last two seconds, and then close it. On closure of the manual start switch 57 to initiate a cleaning cycle, coil RC is energized to close relay contacts R1 (and open relay contacts R2). Contacts R1 are connected in a holding circuit L2 for coil RC paralleling the switch 57 so that the coil will remain energized upon a momentary actuation of switch 57. Solenoid 17 is connected in parallel with coil RC as indicated at L3 and is energized when coil RC is energized.

The programmer motor 55 is connected as indicated at L4 in parallel with solenoid 17 under control of the switch 57 and contacts R1 for energization when switch 57 is closed and for continued energization under the action of contacts R1 when closed until the 128th second of the cycle. The motor is also connected as indicated at L5 in series with cam-actuated switch S1 between power source PS and ground. Switch S1, which may be referred to as the full cycle switch, is held open by cam C1 at the start of the cycle, and cam C1 is formed to close switch S1 after about 5 seconds and hold it closed until the end of a cycle (the 130th second). The circuitry is such that although relay coil RC is deenergized by the opening of reset switch S2 at the 128th second, and contacts R1 thereupon open, switch S1 holds the motor energized until the 130th second to bring the cams back to their home position.

Switch 53, relay contacts R2, and switches S3 and 23 are connected in series with a coin return electromagnet 59 in a line L6 between power source PS and ground. This electromagnet is that usually provided in a vendor in association with the coin selector and slug rejector of the vendor controlling a gate which is normally withdrawn from the coin selector and slug rejector as long as the electromagnet is energized thereby to permit deposit of coins, but which is thrown into the coin selector and slug rejector to return coins to a customer when the electromagnet is deenergized. Switches 23 and 53 are safety switches, switch 23 remaining open if the spout 15 should, on account of mechanical failure, remain in by-pass position, and switch 53 remaining open if the nozzle 45 should, on account of mechanical failure, remain in down position. Under either of these circumstances, electromagnet 59 will be deenergized to divert inserted coins back to the customer and thereby prevent operation of the vendor.

Solenoid 51 is connected between the power source PS and ground in series with relay contacts R1 and switch S4 as indicated at L7. Cam C4, which controls switch S4, is formed to hold switch S4 open at the start of the cycle, close it at the 2nd second and hold it closed until the 12th second, then to open it and hold it open until the end of the cycle.

Switch S5 controls the operation of the pump P, being connected in series between the power source PS and ground with the pump motor PM as indicated at L8. Cam C5, which controls switch S5, is formed to hold switch S5 open at the start of a cycle, close it at the 2nd second, and hold it closed until the 10th second, then to open it and hold it open until the end of the cycle.

Switch S6 controls the hot water valve 7, being connected in series between the power source PS and ground with valve 7 as indicated at L9. Cam C6, which controls switch S6, is formed to hold switch S6 open at the start of a cycle, to close it from the 10th to the 14th second, to open it from the 14th to the 69th second, to close it from the 69th to the 75th second, to open it from the 75th to the 100th second, to close it from the 100th to the 104th second, and to open it from the 104th second to the end of the cycle.

Switch S7 controls the brewer valve 11, being connected in series between the power source and ground with valve 11 as indicated at L10. Cam C7, which controls switch S7, is formed to hold switch S7 open at the start of a cycle, close it from the 2nd to the 60th second, open it from the 60th to the 69th second, close it from the 69th to the 91st second, open it from the 91st to the 100th second, close it from the 100th to the 126th second, and to open it from the 126th second to the end of the cycle.

Switch S8 is interconnected as indicated at L11 with the vend system. Cam C8, which controls switch S8, is formed to hold switch S8 closed at the start of a cleaning cycle, to open it at the 2nd second and to hold it open until the 130th second, whereupon it recloses. The purpose of this is to prevent operation of the vend system during a cleaning cycle.

Operation is as follows:

With the brew cup 25 in its upright position and the lid 35 in its closed position, as shown in solid lines in FIG. 1, a cleaning cycle is initiated by closing the manual start switch 57. The brew cup will have been previously cleared of spent coffee grounds during the terminal phase of the previous vend operation. On closure of switch 57, relay coil RC is energized via line L1 (reset switch S2 being closed at this time) to close relay contacts R1 and open relay contacts R2. With contacts R1 closed, holding circuit L2 is closed and coil RC remains energized even though switch 57 is released. Also, solenoid 17 is immediately energized via line L3 to swing the spout 15 to its cup by-pass position (shown in dotted lines in FIG. 1) and the spout remains in the by-pass position. Also, programmer motor 55 is immediately energized via line L4 and remains energized to drive cams C1–C8 through their single-revolution 130 second cycle. With contacts R2 open, electromagnet 59 is maintained deenergized for return to a customer of any coins deposited during the cleaning cycle.

At the 2nd second of the cycle, cam C4 closes switch S4 for energization of solenoid 51 via line 7 and solenoid 51 swings nozzle 45 down into the funnel 49, as shown in dotted lines in FIG. 1. Cam C5 closes switch S5 for energization of the pump motor PM to drive the pump P to deliver cleaning agent from container 39 through line 43 and nozzle 45 into the funnel 49, which in turn delivers the cleaning agent into line 5 for flow to the brewer 1. Cam C7 closes switch S7 for energization of the brewer outlet valve 11 to close it, so as to hold the cleaning agent (and hot water to be subsequently delivered) in the brewer.

At the 5th second of the cycle, cam C1 closes the full cycle switch S1.

At the 10th second of the cycle, cam C5 opens switch S5, and the pump P stops. Also, cam C6 closes switch S6 to energize the hot water valve 7 to open it, whereupon hot water flows from tank 3 through line 5 into the brewer.

At the 12th second of the cycle, cam C4 opens switch S4 to deenergize solenoid 51, whereupon the nozzle 45 swings up to its retracted position.

At the 14th second of the cycle, cam C5 opens switch S6 to deenergize valve 7 to cut off flow of hot water from the tank.

The hot water delivered to the brewer during the 10th to the 14th second dissolves the cleaning agent delivered to the brewer by the pump during the 2nd to the 10th second to constitute a cleaning solution, which remains in the brewer (and line 9 down to valve 11) until the 60th second, valve 11 being closed from the 2nd to the 60th second. The cleaning solution, in this interval, effects a thorough cleaning of the brewer.

At the 60th second, cam C7 opens switch S7 to deenergize valve 11 to open it, whereupon the cleaning solution drains out of the brewer and line 9 into the mixing bowl 13, and drains out of the mixing bowl via the spout 15 which is in cup by-pass position, thence to the waste can 21.

At the 69th second, cam C6 closes switch S6 to energize the hot water valve 7 to open it for flow of hot water from tank 3 through line 5 to the brewer. Also, cam C7 closes switch S7 to energize the brewer outlet valve 11 to close it.

At the 75th second, cam C6 opens switch S6 to deenergize the hot water valve 7 to close it to cut off flow of hot water to the brewer. The hot water delivered to the brewer during the 69th to 75th second remains in the brewer (and line 9 down to valve 11) until the 91st second, valve 11 being closed from the 69th to the 91st second, and effects a first rinse of the brewer.

At the 91st second, cam C7 opens switch S7 to deenergize valve 11 to open it, whereupon the first rinse water drains out of the brewer and line 9 into the mixing bowl 13, and drains out of the mixing bowl via the spout 15 which is in cup by-pass position, thence to the waste can 21.

At the 100th second, cam C6 closes switch S6 to energize the hot water valve 7 to open it for flow of hot water from tank 3 through line 5 to the brewer. Also, cam C7 closes switch S7 to energize the brewer outlet valve 11 to close it.

At the 104th second, cam C6 opens switch S6 to deenergize valve 7 to close it to cut off flow of hot water to the brewer. The hot water delivered to the brewer during the 100th to 104th second remains in the brewer (and line 9 down to valve 11) until the 126th second, valve 11 being closed from the 100th to the 126th second, and effects a second rinse of the brewer.

At the 126th second, cam C7 opens switch S7 to deenergize valve 11 to open it, whereupon the second rinse water drains out of the brewer and line 9 into the mixing bowl 13, and drains out of the mixing bowl via the spout 15, which is still in cup by-pass position, thence to the waste can 21.

At the 128th second, cam C2 opens the switch S2 to deenergize the relay coil RC, thereby opening contacts R1 and closing contacts R2. On opening contacts R1, solenoid 17 is deenergized so that spout 15 swings back to its coffee-delivery position (shown in solid lines in FIG. 1). While the L4 motor circuit is opened when contacts R1 open, the programmer motor 55 is maintained energized to the 130th second to bring the cams C1–C8 back to the home position by reason by of cam C1 holding the full cycle switch S1 closed during the last 2 seconds of the cycle for energization of the motor via line L5.

Switch S8 is open from the 2nd to the 130th second to prevent instigation of a vend cycle during a cleaning cycle, and electromagnet 59 is deenergized from the start of a cleaning cycle to the 128th second of the cleaning cycle (due to contacts R2 being open from the start to the 128th second) for return to a customer of any coins deposited during the cleaning cycle. If, on account of mechanical failure, spout 15 should fail to swing back to coffee-delivery position at the 128th second of a cleaning cycle, or nozzle 45 should fail to swing back to retracted position at the 12th second of a cleaning cycle, electromagnet 59 will remain deenergized for return to a customer of deposited coins to nullify any subsequent vending operation until the vendor is serviced to take care of the mechanical failure.

From the above, it will appear that the brewer 1 (and line 9) may be automatically given a thorough cleaning, comprising application of cleaning agent from container 39 and hot water from the tank 3 with the resultant cleaning solution held in the brewer for an appropriate interval, followed by two hot water rinses simply by closing the switch 57. This makes it easy for the serviceman to keep the brewer clean, and tends to insure that he will keep the brewer clean. Provision of the swinging nozzle 45 for delivery of cleaning agent with the nozzle being retracted after delivery of the cleaning agent positively insures against leakage of cleaning agent into the brewer system during a vend cycle to prevent contamination of the brewed coffee, and is preferred to use of a valve for cutting off flow of cleaning agent, since a valve may develop a leak. Provision of the swinging spout 15 with the spout swinging to by-pass position prevents the possibility of the cleaning solution and rinse water being delivered into a cup and being drunk in the mistake that it is a cup of coffee.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a coffee vendor having a brewer, a hot water tank, and means for delivering hot water from the tank to the brewer, a cleaning system comprising means for delivering a cleaning agent from a supply thereof to the brewer, programming means for operation through a cleaning cycle involving delivery of cleaning agent from said supply and hot water from the tank to the brewer, followed by at least one rinse of hot water from the tank, and means for initiating operation of said programming means, said means for delivering the cleaning agent including a nozzle movable between a retracted and a delivery position, and said programming means including means for moving said nozzle to delivery position for delivery of cleaning agent to the brewer followed by retraction of the nozzle to preclude leakage of cleaning agent into the brewer.

2. In a coffee vendor as set forth in claim 1, means for returning coins deposited in said vendor during a cleaning cycle operable in response to initiation of operation of said programming means, and means for maintaining said coin return means in operation in the event of nonretraction of the nozzle.

3. In a coffee vendor having a brewer, a hot water tank, and means for delivering hot water from the tank to the brewer, a cleaning system comprising means for delivering a cleaning agent from a supply thereof to the brewer, programming means for operation through a cleaning cycle involving delivery of cleaning agent from said supply and hot water from the tank to the brewer, followed by at least one rinse of hot water from the tank, and means for initiating operation of said programming means, a coffee delivery spout movable between a position for delivering coffee into a cup and a cup by-pass position, said programming means including means for moving said spout to its said by-pass position at the start of a cleaning cycle and maintaining it in by-pass position substantially throughout the cleaning cycle, followed by return of the spout to coffee-delivery position.

4. In a coffee vendor as set forth in claim 3, means for returning coins deposited in said vendor during a cleaning cycle operable in response to initiation of operation of said programming means, and means for maintaining said coin return means in operation in the event of nonreturn of the spout.

5. A coffee vendor having a brewer, a hot water tank, a line for delivering hot water from the tank to the brewer, a valve for said hot water line, a mixer, a line for delivery of coffee from the brewer to the mixer, an outlet valve for said brewer, and an outlet from said mixer for delivery of coffee to a cup, means for delivering a cleaning agent from a supply thereof to the brewer, programming means for operation of the vendor through a cleaning cycle comprising operation of said means for delivering cleaning agent to the brewer, opening of said hot water valve for delivering hot water to the brewer and closure of said outlet valve to hold the cleaning agent and hot water in the brewer for a cleaning interval, followed by opening of said outlet valve to drain off the cleaning agent and hot water, and then by opening of said hot water valve for a rinse, and means for manually initiating operation of said programming means, said means for delivering the cleaning agent comprising an inlet connected into said hot water delivery line between the hot water valve and the brewer and a nozzle movable between a retracted position away from the inlet and a delivery position for delivery into the inlet, said programming means including means for moving said nozzle to its said delivery position during delivery of cleaning agent followed by retraction of the nozzle to preclude leakage of cleaning agent into the inlet.

6. A coffee vendor as set forth in claim 5 further comprising means for returning coins deposited in said vendor during a cleaning cycle operable in response to initiation of operation of said programming means, and means for maintaining said coin return means in operation in the event of nonretraction of the nozzle.

7. A coffee vendor having a brewer, a hot water tank, a line for delivering hot water from the tank to the brewer, a valve for said hot water line, a mixer, a line for delivery of coffee from the brewer to the mixer, an outlet valve for said brewer, and an outlet from said mixer for delivery of coffee to a cup, means for delivering a cleaning agent from a supply thereof to the brewer, programming means for operation of the vendor through a cleaning cycle comprising operation of said means for delivering cleaning agent to the brewer, opening of said hot water valve for delivering hot water to the brewer and closure of said outlet valve to hold the cleaning agent and hot water in the brewer for a cleaning interval, followed by opening of said outlet valve to drain off the cleaning agent and hot water, and then by opening of said hot water valve for a rinse, and means for manually initiating operation of said programming means, the mixer outlet comprising a spout movable between a position for delivery of coffee into a cup and a cup by-pass position, and wherein said programming means includes means for moving said spout to its said by-pass position at the start of a cleaning cycle and maintaining it in by-pass position substantially throughout the cleaning cycle, followed by return of the spout to coffee-delivery position.

8. A coffee vendor as set forth in claim 7 further comprising means for returning coins deposited in said vendor during a cleaning cycle operable in response to initiation of operation of said programming means, and means for maintaining said coin return means in operation in the event of nonreturn of the spout.

9. In a coffee vendor having a brewer, a source of hot water and means for delivering hot water from said source to the brewer, a cleaning system comprising a container for holding a supply of a cleaning agent, means independent of the hot water delivery means for dispensing cleaning agent from said container whereby cleaning agent is dispensed from said container without flow of water through said container, means for delivering cleaning agent dispensed from said container to the brewer, programming means for operation through a cleaning cycle involving dispensing of cleaning agent from said container and delivery thereof to the brewer and delivery of hot water from said source thereof to the brewer, followed by at least one rinse of hot water from said source thereof, and means for initiating operation of said programming means.

10. In a coffee vendor as set forth in claim 9, wherein said container is adapted to hold a liquid cleaning agent, and said means for dispensing cleaning agent from said container comprises a pump for pumping said liquid cleaning agent from said container for delivery to the brewer.

11. In a coffee vendor as set forth in claim 9, said brewer having inlet means for hot water and cleaning agent, a separate outlet, and a valve for said outlet, said programming means including means for closing said valve to hold the cleaning agent and hot water in the brewer for a cleaning interval and opening said valve to discharge the cleaning agent and hot water at the termination of the cleaning interval, then closing the valve to hold the hot water rinse in the brewer for a rinse interval and opening said valve to discharge the rinse.

12. In a coffee vendor as set forth in claim 9, said means for delivering cleaning agent dispensed from said container to the brewer including means for breaking communication to the brewer when delivery of cleaning agent has been completed to preclude leakage of cleaning agent into the brewer.

13. In a coffee vendor as set forth in claim 12, said means for breaking communication comprising a nozzle movable between a retracted and a delivery position.

14. A coffee vendor having a brewer, a hot water tank, a line for delivering hot water from the tank to the brewer, a valve for said hot water line, a mixer, a line for delivery of coffee from the brewer to the mixer, an outlet valve for said brewer, and an outlet from said mixer for delivery of coffee to a cup, a container for holding a supply of a cleaning agent, means independent of the hot water line for dispensing cleaning agent from said container whereby cleaning agent is dispensed from said container without flow of water through said container, means for delivering cleaning agent dispensed from said container to the brewer, programming means for operation of the vendor through a cleaning cycle comprising operation of said dispensing means for delivering cleaning agent to the brewer, opening of said hot water valve for delivering hot water to the brewer and closure of said outlet valve to hold the cleaning agent and hot water in the brewer for a cleaning interval, followed by opening of said outlet valve to drain off the cleaning agent and hot water, and then by opening of said hot water valve for a rinse, and means for manually initiating operation of said programming means.

15. In a coffee vendor having a brewer, a hot water tank, and means for delivering hot water from the tank to the brewer, a cleaning system comprising means for delivering a cleaning agent from a supply thereof to the brewer, programming means for operation through a cleaning cycle involving delivery of cleaning agent from said supply and hot water from the tank to the brewer, followed by at least one rinse of hot water from the tank, and means for initiating operation of said programming means, said means for delivering the cleaning agent including a nozzle movable between a retracted position wherein leakage of cleaning agent into the brewer is precluded and a delivery position for delivery of cleaning agent into the brewer, said programming means including means for moving said nozzle to retracted position after delivery of cleaning agent to the brewer.

References Cited

UNITED STATES PATENTS

| | | | |
|---|---|---|---|
| 2,770,248 | 11/1956 | Audia | 137—240 |
| 3,338,153 | 8/1967 | Holstein et al. | 99—282 X |

WILLIAM I. PRICE, *Primary Examiner.*